W. A. STAPLES.
Straw Cutter.
No. 1,409.
Patented Nov. 16, 1839.
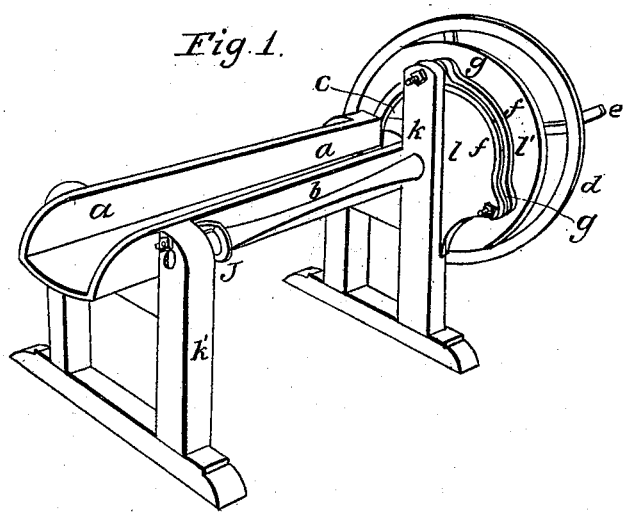
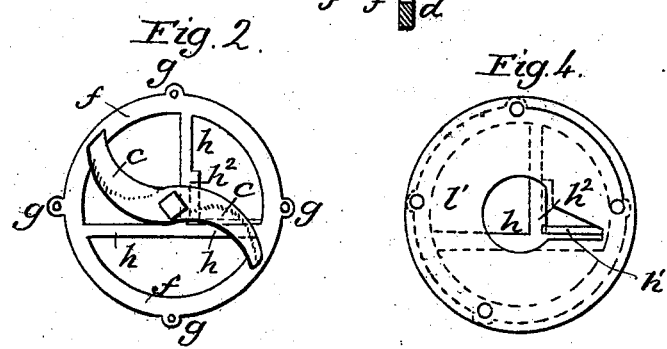
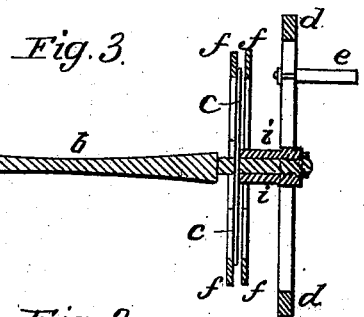

UNITED STATES PATENT OFFICE.

WM. A. STAPLES, OF LYNCHBURG, VIRGINIA.

STRAW-CUTTER.

Specification of Letters Patent No. 1,409, dated November 16, 1839.

*To all whom it may concern:*

Be it known that I, WILLIAM A. STAPLES, of Lynchburg, in the county of Campbell and State of Virginia, have invented certain new and useful Improvements in Machines for Cutting Straw; and I do hereby declare that the following is a full and exact description thereof.

In the accompanying drawing, Figure 1, is a perspective view of the whole machine, *a, a,* being the trough, or box, within which the straw to be cut is to be placed.

*b,* is a shaft which carries the knives, seen at *c, c,* Fig. 2; *d,* is a fly-wheel at the end of the shaft, and *e,* a winch by which it may be turned. The shaft *b,* revolves in collars, or bearings, in the posts *k, k',* of the frame; and to adjust it lengthwise, I employ a collar *j,* which is adapted to a neck in the shaft, and by turning screw-nuts on the shank *j',* of this collar, the necessary adjustment is readily effected. The knife *c, c,* is to run between two circular rims of iron *f, f,* Fig. 2, which have ears *g, g,* upon them by which they may be attached to the front end of the frame and cutting box. *h, h', h²,* are cross bars in one piece with these rims, the portions *h',* and *h²,* of which correspond with the bottom and inner side of the box, and constitute the stationary bed shears against which the knives act. A second rim, similar in all respects to that shown in Fig. 2, is placed immediately in front of it, with washers between the ears of sufficient thickness to allow the knives to revolve between the said rims, the ends of the knives being embraced by the rims. Being thus sustained, they may be made of thin plates of steel, without danger of their bending, or yielding.

*l,* and *l',* are facings, or coverings, of plank, embracing the rims; the plank *l,* being attached to the frame *k,* and that marked *l',* being bolted on to the face of the outer rim, as shown in Fig. 4. This latter is perforated to admit the shaft, and for the discharge of the cut straw.

Fig. 3, is a sectional view of the shaft, the rims, knife, and fly-wheel. The knife has a square hole through its center, which fits on to a corresponding square on the shaft.

*i, i,* represents a collars which bears against the knife, and is forced up against it by the nut, or wedge, which confines the fly-wheel in place.

When the straw is fed up by hand, the face board, or covering, *l',* will serve to regulate the length to be cut; but, if desired, feeding rollers may be employed, as in some other machines, which may be turned by gearing from the shaft *b,* or in any of the known modes of operating such rollers.

Having thus fully described the manner in which I construct my straw-cutter, what I claim therein as constituting my invention, and desire to secure by Letters Patent, is—

The employment of the double rims *f, f,* between which the ends of the knife, or knives, are received, and revolve; said rims being furnished with cross bars which operate as stationary, or bed, shears, sustaining the straw on each side as it is cut by the knife, my mode of making the knives and fastening them on the axle and the arrangement of the parts as described herein.

I have represented two knives as used, and this I think, will be, generally, found to be the best number, but a single knife may be employed, if preferred, and the machine will then be turned with one half the power required to operate two knives.

WILLIAM A. STAPLES.

Witnesses:
BRANCH A. HILL,
M. A. L. STAPLES.